US010189935B2

(12) United States Patent
Karppi et al.

(10) Patent No.: US 10,189,935 B2
(45) Date of Patent: Jan. 29, 2019

(54) WATER SOLUBLE CROSS-LINKED BLOCK COPOLYMERS

(71) Applicant: KEMIRA OYJ, Helsinki (FI)

(72) Inventors: Asko Karppi, Turku (FI); Matti Hietaniemi, Espoo (FI); Sacha Legrand, Helsinki (FI)

(73) Assignee: KEMIRA OYJ, Helsinki (FI)

( * ) Notice: Subject to any disclaimer, the term of this patent is extended or adjusted under 35 U.S.C. 154(b) by 0 days.

(21) Appl. No.: 15/300,076

(22) PCT Filed: Apr. 10, 2015

(86) PCT No.: PCT/EP2015/057832
§ 371 (c)(1),
(2) Date: Sep. 28, 2016

(87) PCT Pub. No.: WO2015/155330
PCT Pub. Date: Oct. 15, 2015

(65) Prior Publication Data
US 2017/0145138 A1 May 25, 2017

(30) Foreign Application Priority Data

Apr. 11, 2014 (FI) ..................................... 20145350

(51) Int. Cl.
| | |
|---|---|
| B01J 41/14 | (2006.01) |
| C02F 11/14 | (2006.01) |
| C08F 293/00 | (2006.01) |
| D21H 17/37 | (2006.01) |
| D21H 21/10 | (2006.01) |
| D21H 21/18 | (2006.01) |
| C02F 1/56 | (2006.01) |
| C08F 4/04 | (2006.01) |
| C08F 4/36 | (2006.01) |

(52) U.S. Cl.
CPC ............ C08F 293/005 (2013.01); B01J 41/14 (2013.01); C02F 1/56 (2013.01); C02F 11/14 (2013.01); C08F 4/04 (2013.01); C08F 4/36 (2013.01); D21H 17/375 (2013.01); D21H 21/10 (2013.01); D21H 21/18 (2013.01); C08F 2438/01 (2013.01)

(58) Field of Classification Search
CPC .... C08F 1/56; C08F 4/04; C08F 11/14; C08F 293/005; C08F 4/36; C08F 2438/01; B01J 41/14; D21H 17/375; D21H 21/10; D21H 21/18
See application file for complete search history.

(56) References Cited

U.S. PATENT DOCUMENTS

| | | | |
|---|---|---|---|
| 2002/0055124 A1* | 5/2002 | Janda ................... | C07D 211/94 435/7.1 |
| 2004/0182533 A1 | 9/2004 | Blum et al. | |
| 2007/0031499 A1 | 2/2007 | Huh et al. | |
| 2007/0107864 A1 | 5/2007 | Hahnle et al. | |
| 2010/0280182 A1 | 11/2010 | Balk et al. | |
| 2011/0213091 A1 | 9/2011 | Balk et al. | |
| 2011/0282007 A1 | 11/2011 | Balk et al. | |
| 2012/0214930 A1 | 8/2012 | Broecher et al. | |

FOREIGN PATENT DOCUMENTS

| | | |
|---|---|---|
| EP | 0 472 352 A1 | 2/1992 |
| WO | WO2013057267 | 4/2013 |

OTHER PUBLICATIONS

Gravert, Dennis J. et al. Tetrahedron Letters vol. 39 (1998) pp. 1513-1516.*
Finnish Search Report, dated Nov. 28, 2014, from corresponding Finnish application.
International Search Report, dated Jun. 22, 2015, from corresponding PCT application.
Chinese Office Action dated Feb. 2, 2018 in corresponding Chinese Patent Application No. 201580019355.8 with English translation of Chinese Office Action.

* cited by examiner

Primary Examiner — Irina S Zemel
Assistant Examiner — Jeffrey S Lenihan
(74) Attorney, Agent, or Firm — Young & Thompson

(57) ABSTRACT

The invention provides new water soluble polymers for the use in industrial processes, where large quantities of water is handled, such as sludge dewatering and papermaking. These new polymers are water soluble cross-linked block copolymers, wherein the block copolymers are cross-linked together using a cross-linking agent. Each of the block copolymers contain two different blocks, and these blocks are formed from different monomers. The blocks are linked together with a molecular spacer derived from a bifunctional initiator used during the polymerization of the blocks. The monomers used in polymerizing the blocks are different with each other and they are selected from a group consisting of N-vinylformamide, acrylic acid, acrylamide and water-soluble derivatives thereof.

20 Claims, 2 Drawing Sheets

WATER SOLUBLE CROSS-LINKED BLOCK COPOLYMERS

FIELD OF THE INVENTION

The invention relates to water soluble cross-linked block copolymers. More particularly, the invention relates to cross-linked block copolymers, which are based on the block copolymerization of monomers by using a bifunctional initiator and then cross-linking these block copolymer together. Further, the present invention concerns a method of preparing the cross-linked block copolymers. The invention also relates to the use of these polymers in various processes such as sludge dewatering and papermaking processes.

BACKGROUND OF THE INVENTION

Polyelectrolytes are water soluble polymers carrying ionic charge along the polymer chain. Depending upon the charge, these polymers may be anionic or cationic. Homopolymers of acrylamide are also included in the family of polyelectrolytes though they do not carry any charge. These are called nonionic. Polyelectrolyte flocculants can be generally divided into two groups, depending on their molecular character and mode of operation: 1) primary coagulants, and 2) coagulation aids/flocculants.

The primary coagulants have typically high cationic charge density. Thus, they satisfy the "cationic demand" of the negatively charged suspended particles and initiate coagulation and formation of flocks. The primary coagulants have also typically low to medium molecular weight which allows a slow building of flocks, which gives a maximum removal of suspended solids (maximum turbidity reduction). The coagulation aids/flocculants have low charge density and they are used for building the size of flock by bridging the primary flocks. Flocculants have typically very high molecular weight.

There are many factors affecting the selection of the appropriate polyelectrolyte for a given process. Some of the factors causing challenges are high conductivity and high cationic demand of the treated fluid. There is a constant need to develop new polyelectrolyte polymers capable of facing these challenges.

Major applications of flocculants are their inherent solid liquid separating efficiency. This makes polyelectrolytes useful in applications in potable water, industrial raw and process water, municipal sewage treatment, mineral processing and metallurgy, oil drilling and recovery, paper and board production, etc. In all these applications the solid liquid separation property is commonly exploited.

Flocculants also behave as filter aids by modifying the filtration characteristics of suspended solids. Many of the slurries that are difficult to filter are modified by the use of polymeric flocculants at a relatively low dosage so that filtration rates become much faster. The ability of flocculants to dewater slurry especially encountered in municipal sewage treatment, mineral processing industry and metallurgical industry may be tackled by the use of high molecular weight flocculants. Color removal is another area of application of flocculants. The charge carried by the polymer is responsible for the abstraction of dissolved coloring matter from the waste water stream and hence color removing flocculants have wide applications in the waste water treatment.

Municipal effluent is treated in various ways depending on its composition, mainly to remove bioactive materials from the produced water. Various flocculants including polymeric flocculants have been used in order to flocculate and dewater sludge generated from municipal sewage and industrial wastewater. Environmental issues have brought about increasing pressure to remove all such materials including suspended solids from sewage effluent. Polyelectrolytes can be used in some or all of the sedimentation stages of the sewage treatment, but the main use is for sludge dewatering.

In recent years, sludge generated from municipal sewage and industrial wastewater has been increasing because of changes in the recent living environment. Furthermore, the properties of the sludge are becoming worse. Due to increasing demand of cationic polymer flocculants in these application there is a need to develop new cationic block copolymers designed for cost-effective solids/liquid separation processes.

Turbidity in raw water is mainly due to colloidal particles. Therefore coagulation, sedimentation, and filtration are required in water purification. The process typically involves removal dissolved organic matter and suspended solids of the water. Flocculants are used to help the removal of these. For example flocculants are commonly used for the treatment of drinking water. Methods and chemicals used or producing drinking water are, however, strictly regulated by laws and regulations.

In addition to the use as polymeric flocculants, water-soluble polymers, in particular, high-molecular weight water-soluble polymers are used in various technical fields such as retention aids, paper strength agents, and thickeners.

Such water-soluble polymers include homopolymers prepared by polymerizing an anionic monomer such as an acrylate or a methacrylate, a cationic monomer such as dimethylaminoethyl(meth)acrylate quaternary salt, or a nonionic monomer such as (meth)acrylamide and also include ionic polymers such as copolymers of an anionic monomer and a nonionic monomer; copolymers of a cationic monomer and a nonionic monomer; and copolymers of a cationic monomer, an anionic monomer, and a nonionic monomer.

As mentioned above, polyelectrolytes are very useful in paper making. Apart from aiding paper mill effluent treatment, polyelectrolytes have numerous applications in the actual manufacture of paper and paper board, such as a) improving the retention on the paper machine of fibers, fillers, dyestuffs and/or sizing chemicals; b) improving paper machine drainage (on machine dewatering); c) improving the 'dry strength' of paper made with recycled fibers; d) improvement of 'wet strength' of certain paper grades. Polyelectrolytes used in these applications are often referred to as fixatives, drainage aids, and/or retention aids. They may be added to the pulp before or during the paper production. The term "fixing" generally implies the binding of small particles to pulp fibers. Fixatives build up agglomerates with colloidal material in the water phase and attach them onto fibers so that they end up in the final paper sheet.

It is known that the existing water soluble polymers do not work well under all circumstances. Therefore there is a constant need to find better performing polymers or at least find new alternatives for the existing ones.

BRIEF DESCRIPTION OF THE INVENTION

An object of the present invention is thus to provide a new polymers, which could be used as polyelectrolytes in different industrial processes, such as sludge dewatering or papermaking. The objects of the invention are achieved by a water soluble cross-linked block copolymer which is characterized by what is stated in the independent claim 1. The preferred embodiments of the invention are disclosed in the dependent claims.

Accordingly the present invention provides as a first aspect a water soluble cross-linked block copolymer, which contains block copolymers cross-linked together using a cross-linking agent, and wherein
  i. each of the block copolymers contain a first block and a second block, and the first and the second block are formed from different monomer compositions,
  ii. the first and second blocks are linked together with a molecular spacer derived from a bifunctional initiator used during the polymerization of said blocks, and
  iii. the monomer compositions used in forming the first and second blocks contain one or more monomers selected from a group comprising water-soluble non-ionic, cationic or anionic (meth)acrylic monomers, cationic non-acrylic monomers, itaconic acid, and N-vinylformamide, and derivatives thereof.

In a second aspect the invention provides a method for preparing a water soluble cross-linked block copolymers. In further aspect the invention provides the use of the water soluble cross-linked block copolymers according to the invention in papermaking process, in sludge dewatering or in water purification process.

It is an advantage of the invention that by cross-linking the copolymers it is possible to further modify the functionality of said copolymers. The structural difference leads to better efficiency such as higher charge density and thereby higher affinity on fiber, when the polymer is used in paper manufacturing applications. In some embodiments it is also possible to obtain better retention of the polymer with lower total charge.

BRIEF DESCRIPTION OF THE DRAWINGS

In the following the invention will be described in greater detail by means of preferred embodiments with reference to the attached drawings, in which.

DETAILED DESCRIPTION OF THE INVENTION

The present invention relates to a new type of synthetic polyelectrolytes, which are water soluble cross-linked block copolymers. These cross-linked block copolymers are novel and have been shown to have applications both for the paper industry (for example as fixatives) and in water quantity and quality management (WQQM) applications (for example as flocculants).

These novel cross-linked block copolymers contain block copolymers cross-linked together using a cross-linking agent, and each of the block copolymers contain a first block and a second block. Further, the first and second blocks are linked together with a molecular spacer. The blocks can be formed from homopolymers or random polymers. Depending how the blocks are formed, the structure of these novel cross-linked block copolymers can be divided to three different types. The schematic structure of these different types is described in the following with examples where only two block copolymers are cross-linked together.

Type 1:
[Block A]-[Spacer]-[Block B]-[Cross linker]-[Block B]-[Spacer]-[Block A]
Type 2:
[Block A/B]-[Spacer]-[Block B]-[Cross linker]-[Block B]-[Spacer]-[Block A/B]
Type 3:
[Block A/B]-[Spacer]-[Block C/D]-[Cross linker]-[Block C/D]-[Spacer]-[Block A/B]
where:
A is cationic monomer,
B is nonionic monomer,
C is cationic or anionic monomer,
D is nonionic monomer,
[Block A] is a homopolymer formed of monomer A,
[Block A/B] is a random copolymer formed of monomers A and B,
[Spacer] is a molecular spacer derived from azo- and peroxo-containing bifunctional initiator, and
[Cross-linker] is any radical polymerizable cross-linking agent.

Figure 1:
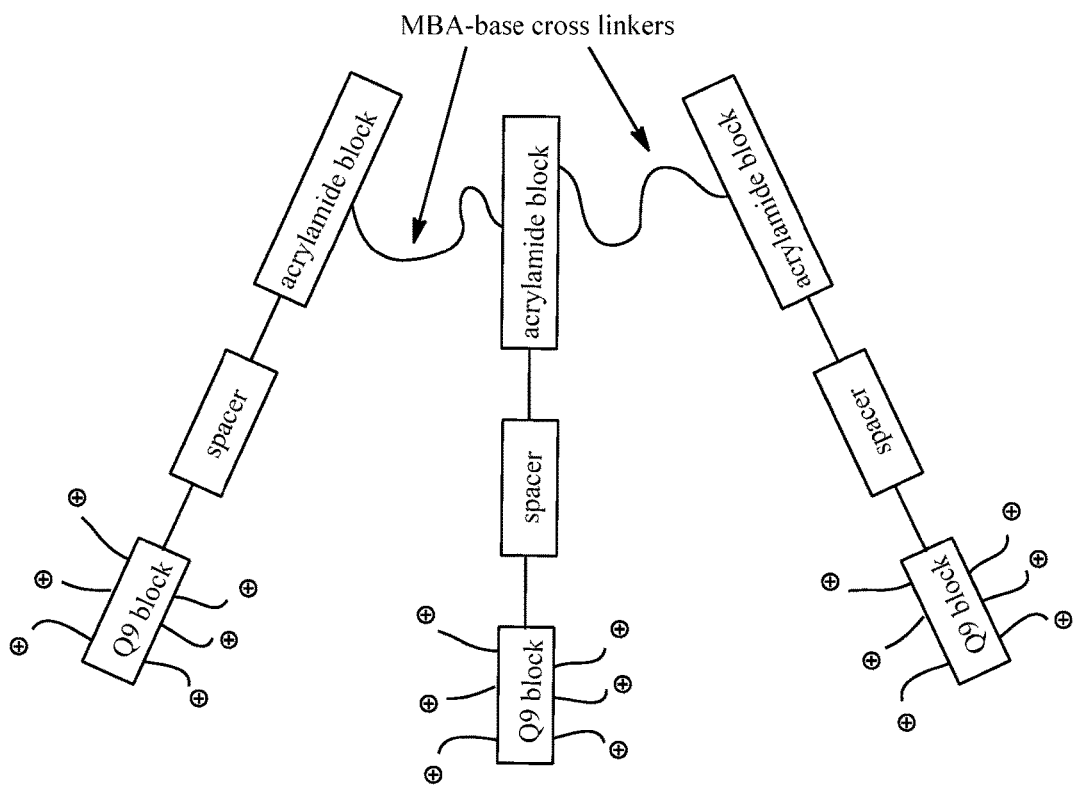
FIG. 1 illustrates a schematic representation of an embodiment of the cross-linked block copolymer according to the present invention.

A schematic structure of a cross-linked block copolymer containing more than two copolymers cross-linked together is illustrated in FIG. 1. In the example illustrated in FIG. 1, the "Block A" is homopolymer formed of a cationic monomer Q9 (dimethylaminoethylacrylate methyl chloride) and the "Block B" is also a homopolymer, but it is formed of a nonionic acrylamide monomer. Both of the blocks in the block copolymer in FIG. 1 are homopolymers.

In the water soluble cross-linked block copolymer of the present invention each of the block copolymers contain a first block and a second block, and the first and the second block are formed from different monomer compositions. According to one embodiment of the invention both the first and the second block are formed of homopolymers ("Type 1"). According to another embodiment the first block is a random copolymer and the second block is a homopolymer or a random copolymer ("Type 2" or "Type 3"). In a Type 3 cross-linked block copolymer the [Block A/B] is typically more cationic than [Block C/D].

The homopolymers and random polymers in the block copolymer are formed from monomer compositions that contain one or more monomers selected from a group comprising water-soluble non-ionic, cationic or anionic (meth)acrylic monomers, cationic non-acrylic monomers, itaconic acid, and N-vinylformamide, and derivatives thereof. Homopolymer naturally means that it is formed from a single monomer. Random polymer block of the present invention is formed from two different monomers which are selected from the same group as the monomers for the homopolymers. The list of possible monomers include (meth)acrylamide, N-methylolacrylamide, N-methylolmethacrylamide, (meth)acrylic acid, methyl acrylate, ethyl acrylate, butyl acrylate, 2-ethylhexyl acrylate, lauryl acrylate, 2-hydroxyethyl acrylate, 2-hydroxypropyl acrylate, methyl methacrylate, ethyl methacrylate, butyl methacrylate, 2-ethylhexyl methacrylate, lauryl methacrylate, stearyl methacrylate, 2-hydroxyethyl methacrylate, 2-hydroxypropyl methacrylate, glycidyl methacrylate, 2-acrylamide-2-methylpropanesulfonic acid (AMPS), dimethylaminoethyl acrylate, diethylaminoethyl acrylate, dimethylaminoethyl methacrylate, diethylaminoethyl methacrylate, N,N-dimethylaminopropylacrylamide, N,N-dimethylaminopropylmethacrylamide, 2-N-morpholinoethyl methacrylate, 2-diisopropylaminoethyl methacrylate, 1-(2-methacryloyloxyethyl) imidazole, 2-(tert-butylamino)ethyl methacrylate, N,N-dimethylaminoethyl acrylamide, N-[2-(dimethylamino)-1,1-dimethylethyl] acrylamide, N-vinylformamide, and their methyl chloride or methyl sulfate quaternaries or mixtures thereof; or methacrylamidopropyltrimethylammonium chloride (MAPTAC), and dimethylaminoethylacrylate methyl chloride (Q9). The list of possible monomers include also itaconic acid and non-acrylic cationic monomers such as diallyldimethylammonium chloride (DADMAC).

Some of the listed monomers are poorly water soluble and it is preferred that the amount of such monomers should be less than one percent in the final copolymer. Such monomers include 2-ethylhexyl acrylate, lauryl acrylate, 2-ethylhexyl methacrylate, lauryl methacrylate, and stearyl methacrylate.

The water soluble block copolymers may be polymerized by using a bifunctional initiator having the formula (I)

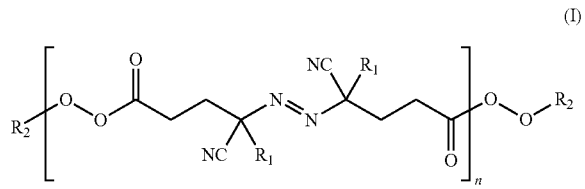

(I)

wherein $R_1$ is H, or $C_{1-5}$-alkyl, $R_2$ is —H, —OAc, —COEt, —CH$_2$-tBu, -tBu, —COPh,

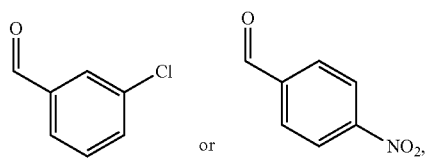 [SMILES: O=Cc1cccc(Cl)c1 ; "or" ; O=Cc1ccc([N+](=O)[O-])cc1]

and n is from 1 to 10.

The water soluble cross-linked block copolymer is formed by cross-linking the formed block copolymers. The cross-linking agent may be any radical polymerizable cross-linking agent, such as N,N'-methylenebisacrylamide (MBA). Other possible cross-linking agents include 1,4-bis(acryloyl)piperazine, N,N'-(1-methyl-1,2-ethanediyl)bis(2-propenamide), N,N'-propylidenebis(2-propenamide), N,N'-butylidenebis(2-propenamide), N,N'-1,12-dodecanediylbis(2-propenamide), N,N'-1,9-nonanediylbis(2-propenamide), N,N'-1,5-pentanediylbis(2-propenamide), N,N'-1,4-butanediylbis(2-propenamide), N,N'-1,6-hexanediylbis(2-propenamide), N,N'-ethylidenebis(2-propenamide), N,N'-1,3-propanediylbis(2-propenamide), N,N'-1,2-ethanediylbis(2-propenamide), N,N'-1,4-cyclohexanediylbis(2-propenamide), N,N'-1,8-octanediylbis(2-propenamide), N,N'-bisacryloyly imidazoline, ethyleneglycol dimethacrylate, 1,4-diacroyl piperazine, pentaerythritol triacrylate, trimethylpropane trimethylacrylate, and pentaerythritol tetraacrylate.

In an embodiment of the present invention the first or the second block is an "NVF-based block", which is a block comprising a homopolymer, which is formed from N-vinylformamide (NVF) monomer. Polymerization of NVF gives an NVF-based homopolymer, which is herein referred to as P(NVF). The block copolymer containing P(NVF) provides the opportunity to hydrolyze the P(NVF) to polyvinylamines (PVAm). Polyvinylamines are more environmentally friendly polymers than acrylamide polymers, and thus, the resulting structured block copolymer containing a block, wherein at least part of the P(NVF) is hydrolyzed to PVAm is "greener" polymer, which is an additional advantage of the present invention. Thus, the invention provides new cross-linked copolymers containing polyvinylamines, which are prepared from the monomer NVF as a replacement to conventionally used acrylamide. Accordingly, in an embodiment of the present invention the formamide groups of the NVF-based block are at least partially hydrolyzed to amino groups.

As an example of the polymerization method for the block copolymer, the Q9-acrylamide based block copolymers may be prepared in a two-step synthetic procedure using a bifunctional initiator. A schematic description of the polymerization process is described below (Scheme A). In the first step of the process, Q9 (1) is reacted with the bifunctional initiator at low temperature (T=0-5° C.) in presence of Na$_2$S$_2$O$_5$ giving the intermediate 2. At this temperature, only the peroxide groups of the initiator react, while the azo group remains intact for the second step of the reaction. Then, acrylamide (3) and MBA (4) can be added to the reaction mixture, which was warmed at higher temperature (about 65° C.). The azo group of the initiator decomposed and was reacted with the double bond of acrylamide, yielding the targeted structured block copolymer (4). The details regarding a typical procedure, where cross-linking and formation of the 2nd block happen at the same time, are presented in the examples.

Scheme A: preparation of a Q9-acrylamide based structured block copolymer

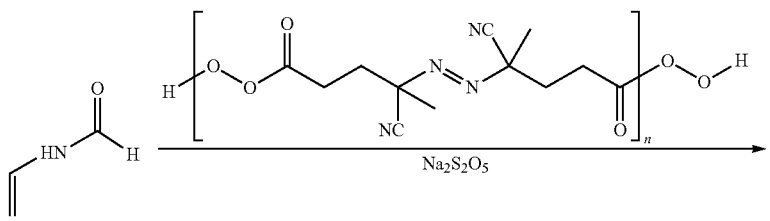

1

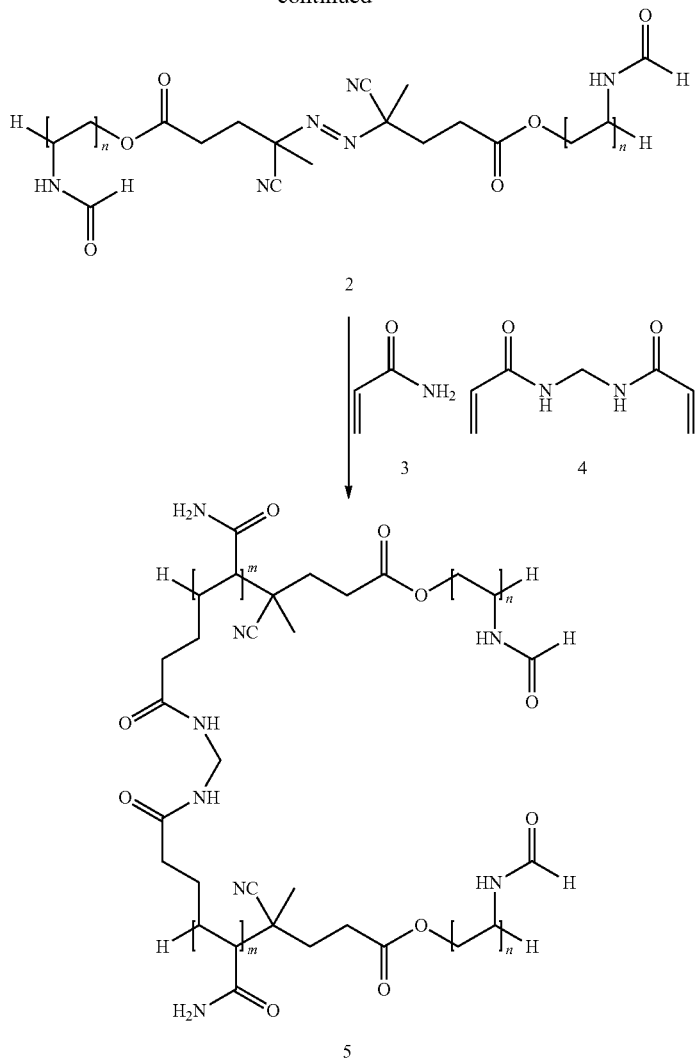

In an embodiment, the structured block copolymer of the present invention contains a P(NVF) block, wherein at least part of the formamide groups have been hydrolyzed to amino groups. The degree of hydrolysis of the formamide groups may vary between 0.5% and 100%. In an embodiment of the present invention the degree of hydrolysis of the formamide groups is at least 10%, but it may as well be at least 20%, 30%, 40%, 50%, 60%, 70%, 80% or 90% depending on the application where the polymer is used. Preferably the degree of hydrolysis is between 50-100%.

After formation of the block copolymer the polymer is then cross-linked with a cross-linking agent. Alternatively the cross-linking agent is already present in the second step of the polymerization of the block copolymer, and thus, the cross-linked polymer is formed directly after the second polymerization step.

As mentioned, one of the advantages of the present invention is the possibility to hydrolyze the formamide groups of the P(NVF) block. The challenge of this hydrolysis step consists of reacting only one group (formamide) without affecting the other groups (primary amides and esters). The NVF-based cross-linked block copolymers according to the invention may contain different reactive chemical groups: formamide from the NVF-based block, primary amide from for example an acrylamide-based block or ester from for example a Q9-based block (depending on which monomer is used as the second monomer), and also an ester from the bifunctional initiator.

It has now been discovered that the selectively hydrolysis of the NVF-based structured block copolymers can be done by an acidic hydrolysis of such a block copolymer (e.g. a structured block copolymer of NVF-spacer-acrylamide). Based on both NMR spectroscopy and GPC measurements, the hydrolysis provides amino groups to the P(NVF) block without hydrolyzing the primary amide and ester moieties.

Accordingly, in an embodiment of the invention, the method further contains a step wherein the vinylformamide groups of the formed structured block copolymer are at least partially selectively hydrolyzed to vinylamine groups. In an embodiment the selective hydrolysis is made by using a strong acid and having pH between 0.5 and 6, preferably pH is between 1 and 2.5. The strong acid used for the hydrolysis is preferably hydrochloric acid (HCl) and it may be optionally used together with sodium dithionite or a as buffer solution. The buffer solution used may be a hydrochloric acid/potassium chloride buffer solution (pH=1 at T=20° C.).

Figure 2:
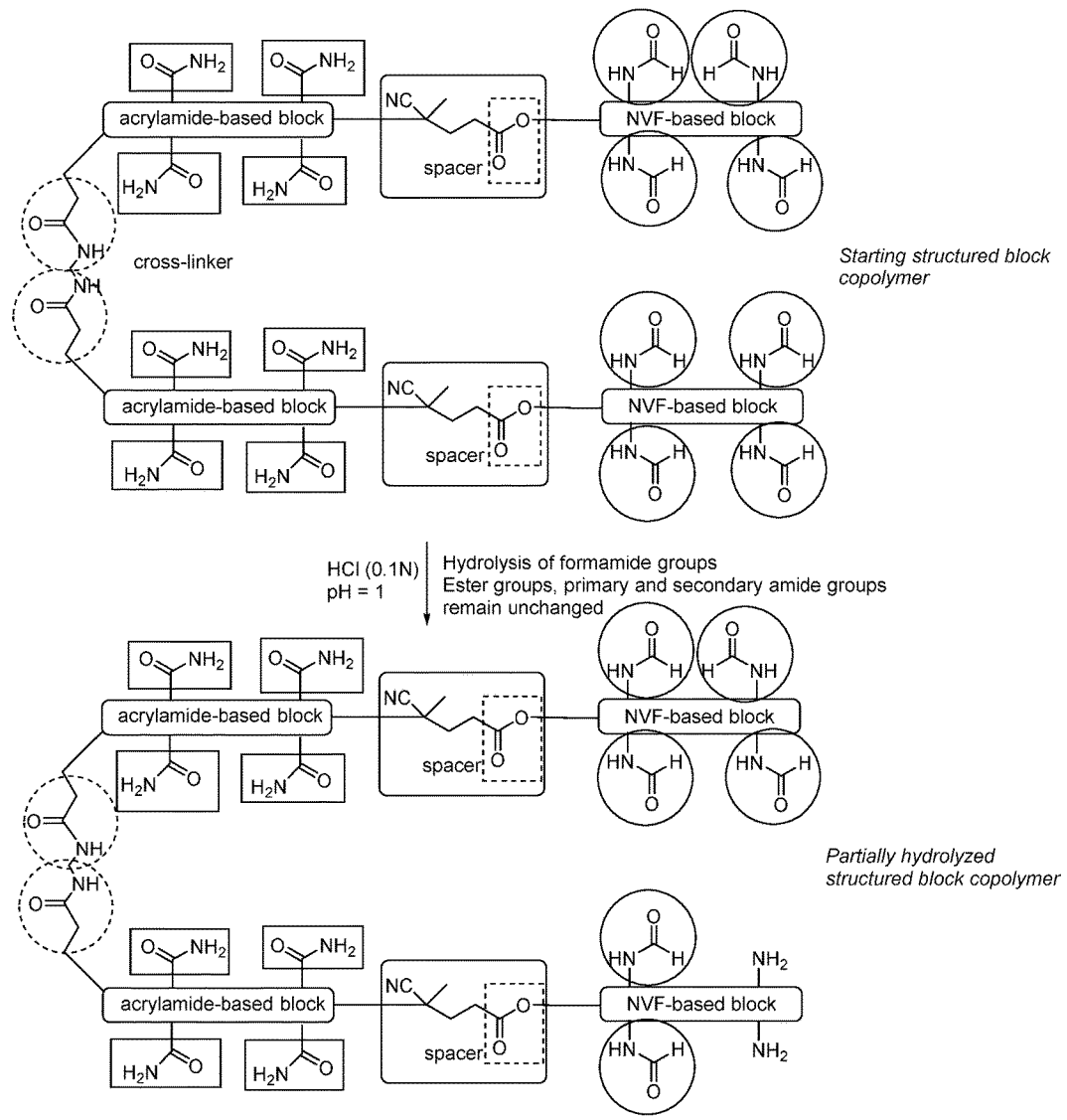
FIG. 2 illustrates a schematic representation of the selective hydrolysis of a cross-linked NVF/acrylamide-based block copolymer using acidic conditions.

A schematic representation of hydrolysis of NVF-acrylamide based cross-linked block copolymer using acidic conditions is shown in FIG. 2.

In one embodiment, the second homopolymer is polymerized using dimethylaminoethylacrylate methyl chloride (Q9) as the monomer. Q9 contains an ester group. As mentioned above also the hydrolysis of a NVF-Q9 based block copolymer provides amino groups to the P(NVF) block without hydrolyzing the ester groups, which are present in the Q9-based block and in the spacer.

In addition to selective hydrolysis under acidic conditions, it has been discovered that the selectively hydrolysis of the NVF-based structured block copolymers can also be done by caustic hydrolysis i.e. under alkaline conditions. Also caustic hydrolysis provides primary amino groups to the P(NVF) block without hydrolyzing the primary amides and esters. In an embodiment the hydrolysis is made by using a strong base and having pH between 8 and 14, preferably pH is between 10 and 12. The strong base is preferably sodium hydroxide (NaOH).

Although using NVF for the formation of one of the block copolymer has interesting benefits due to the possibility of hydrolyzing it, it should understood that it is just an example of many possible alternatives. The cross-linking of the block copolymers is the key of the present invention. Cross-linking the block copolymers provides totally new type of polyelectrolytes that have specific properties. For example Q9-acrylamide based block copolymers are useful polyelectrolytes, but such copolymers are linear and they have a chemical structure where the charges (arising from the Q9 monomer) are found only in one part of the copolymer. This can beneficial in some applications, but such polymers have limited activities as fixatives in certain process conditions due to their linear structure. The cross-linked copolymers from the same monomers have a multidimensional structure and have shown higher activities as fixatives in comparison tests. For example, the cross-linked Q9-acrylamide based block copolymers showed good fixative properties even with pulp having high conductivity (about 10 ms) and high cationic demand (about 10000 meq).

The cross-linking of the block copolymers provides the opportunity to modify the characteristics of the block copolymer. For applications where the polymer should be highly cationic, it is possible to design a polymer that has nonionic "core" and cationic "surface" and still have the same or even better properties than the polymer made solely of cationic monomers. There are also authoritative requirements that polymers have to fulfill in many applications and especially in the purification of water.

The cross-linked block copolymers of the present invention containing Q9 and acrylamide based blocks may be polymerized so that the "core" is formed of acrylamide based blocks and the "surface" comprises the Q9 based blocks. This provides a polymer having the schematic structure shown in FIG. 1. In such a cross-linked block copolymer the monomer ratio between Q9 and acrylamide can be adjusted so that the amount of Q9 is lower than in the corresponding non-cross-linked block copolymer and still obtain equally good results when it is used.

If the above described modification does not fulfill all the requirements it is possible to even further reduce the relative amount of Q9 polymer by modifying the block copolymer even further. This can be done by replacing the first block (i.e. the Q9-block) by a Q9-acrylamide based random copolymer block. Thus instead of having the structure [Q9 block]-[spacer]-[acrylamide block] (Type 1 as discussed earlier), the new structure would be [Q9/acrylamide block]-[spacer]-[acrylamide block] (Type 2).

The water soluble cross-linked block copolymer of the present invention are prepared by using a method, wherein at least two different monomers are polymerized via a two-step copolymerization. The method comprises the following steps:
i. the first block of the block copolymer is polymerized using a bifunctional initiator having the formula (I)

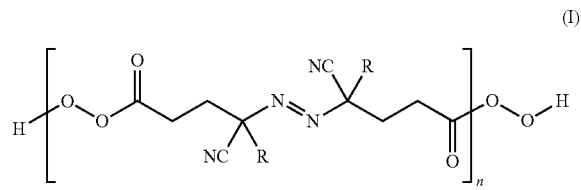

wherein R is H, or $C_{1-5}$-alkyl, and n is from 1 to 10,
ii. the second block of the block copolymer is then polymerized using the same initiator, whereby the bifunctional initiator splits from the N=N bond and the remaining part of the initiator stays in the copolymer and acts as a molecular spacer between the two blocks,
iii. the first or second blocks are cross-linked using a crosslinking agent either during the polymerization of said blocks, or as a separate crosslinking step after the steps i) and ii) are performed, wherein the monomers used in polymerizing the first and second blocks are different with each other and they are selected from a group comprising water-soluble non-ionic, cationic or anionic (meth)acrylic monomers, cationic non-acrylic monomers, itaconic acid, and N-vinylformamide, and derivatives thereof.

The list of possible monomers used in the above method include (meth)acrylamide, N-methylolacrylamide, N-methylolmethacrylamide, (meth)acrylic acid, methyl acrylate, ethyl acrylate, butyl acrylate, 2-ethylhexyl acrylate, lauryl acrylate, 2-hydroxyethyl acrylate, 2-hydroxypropyl acrylate, methyl methacrylate, ethyl methacrylate, butyl methacrylate, 2-ethylhexyl methacrylate, lauryl methacrylate, stearyl methacrylate, 2-hydroxyethyl methacrylate, 2-hydroxypropyl methacrylate, glycidyl methacrylate, 2-acrylamide-2-methylpropanesulfonic acid (AMPS), dimethylaminoethyl acrylate, diethylaminoethyl acrylate, dimethylaminoethyl methacrylate, diethylaminoethyl methacrylate, N,N-dimethylaminopropylacrylamide, N,N-dimethylaminopropylmethacrylamide, 2-N-morpholinoethyl methacrylate, 2-diisopropylaminoethyl methacrylate, 1-(2-methacryloyloxyethyl) imidazole, 2-(tert-butylamino)ethyl methacrylate, N,N-dimethylaminoethyl acrylamide, N-[2-(dimethylamino)-1,1-dimethylethyl] acrylamide, N-vinylformamide, and their methyl chloride or methyl sulfate quaternaries or mixtures thereof; or methacrylamidopropyltrimethylammonium chloride (MAPTAC), and dimethylaminoethylacrylate methyl chloride (Q9). The list of possible monomers include also itaconic acid and non-acrylic cationic monomers such as diallyldimethylammonium chloride (DADMAC)

In an embodiment of the present invention the method comprises a step where the first block is polymerized by using two different monomers and thus a random copolymer is formed. The second block may be polymerized using a single monomer and thus forming a homopolymer, or the second block may also be polymerized by using two different monomers and thus forming a random copolymer to the second block as well.

For the crosslinking a cross-linking agent is used and it is preferably N,N'-methylenebisacrylamide (MBA).

The cross-linked block copolymer according to the present invention may be used in many applications, but it is especially designed to be used in paper making processes and in sludge dewatering.

Wastewater discharged from industrial waste treatment plants must be low in suspended solids, COD, BOD and TOC. Chemical Oxygen Demand (COD) is the total measurement of all chemicals in the water that can be oxidized; Biochemical Oxygen Demand (BOD) measures the amount of food (or organic carbons) that bacteria can oxidize; and Total Organic Carbon (TOC) is the measurement of organic carbons. The cross-linked block copolymers according to the present invention work to increase the particle size and settling rate of suspended material in wastewater. Removal of suspended solids, while benefit in itself, can also cause a decrease in BOD, TOC, and COD. Likewise, industrial sludge must be treated to remove as much water as possible in preparation for transportation and/or final disposal. The cross-linked block copolymer according to the present invention will modify the sludge during the dewatering operation and provide high water release from the sludge at low usage rate and cost. Since liquid sludge cannot typically be safely and inexpensively disposed, the cross-linked block copolymer according to the present invention helps in environmental compliance by properly and consistently aiding in water removal.

Accordingly, an aspect of the invention is the use of the cross-linked block copolymer of the present invention in sludge dewatering or in water purification process. The cross-linked block copolymer can be used as a sludge dewatering polymer or as a flocculant.

Another aspect of the invention is the use of the cross-linked block copolymer of the present invention in paper making processes. In these processes the structured block copolymer of the present invention may act as a fixative or retention agent.

It is apparent to a person skilled in the art that as technology advanced, the basic idea of the invention can be implemented in various ways. The invention and its embodiments are therefore not restricted to the above examples, but they may vary within the scope of the claims.

EXAMPLES

Example 1

Example 1—Polymerization of Q9 and Acrylamide Based Cross-Linked Structured Block Copolymer A 200 mL multi-necks reactor was equipped with a thermometer, a reflux condenser and a nitrogen inlet. The apparatus was purged constantly with nitrogen. In the reactor, Q9 solution (42 g of 50% water solution) was mixed with deionized water (60 g), Versenex 80 (1.5 g; 80% solution). The solution was mixed very well and pH was adjusted to 4.5 with concentrated sulfuric acid. The bifunctional initiator (0.056 g, dissolved in a minimum amount of THF) was added to the previous reaction mixture. After mixing for 10-15 minutes, the reaction mixture was cooled to T=0° C. and $Na_2S_2O_5$ (0.15 g in 15 g of water) was added slowly to the reaction mixture. The temperature was carefully monitored below T=10° C. during addition of $Na_2S_2O_5$. After completion of the addition, the reaction mixture was stirred at T=0° C. overnight (about 16 hours).

In the morning, a small amount of acrylamide (3.75 g in 50% water solution), which was previously acidified to pH=4.5 with concentrated sulfuric acid, was added slowly to the reactor together with the cross-linker MBA (1 mL of a solution of 10 mg in 10 mL water). The reaction mixture was then warmed to T=65°. Then, the rest of acrylamide (26.85 g, 50% water solution) was pumped slowly to the reaction mixture. When the addition was completed, the reaction mixture was stirred at T=65° C. for additional 24 h. The formed cross-linked structured block copolymer was then analyzed by $^1H$ and $^{13}C$ NMR, GPC, solid content, viscosity (Brookfield), pH and charge density.

Solid content (SC): the amount of polymer in solution (%) was determined using a halogen moisture analyzer HR 73 from Metier Todelo and corresponding standard method (T=150° C.).

Viscosity: the viscosity (cP) was determined using a Brookfield Digital Viscometer following the standard instructions (manual M/92-021-P405).

NMR spectra were recorded on spectrometers Bruker Ultra Shield™ 400 (400 MHz for $^1H$ and 100 MHz for $^{13}C$). $D_2O$ was used as solvent and the signal of the solvent as internal standards. Chemical shifts are expressed in ppm and number of protons.

Molecular weight distribution: Mw, $M_n$ and PD were measured using an agilent 1100 series SEC apparatus equipped with a RI detector. Polymers were dissolved in THF before injection. The standards used for the determination of the molecular weight were a series of PEO (polyethylene glycol) with molecular mass (Mw) varying from 430 to 1 015 000.

The charge density measurement (meq/g) was determined using a Mütek™ particle charge detector (PCD-03) from BTG Mütek GmbH. The standards used were the cationic solution poly-DADMAC (c=0.001 mol/L) and the anionic solution PES-Na (polyethene sodium sulfonate; c=0.001 mol/L).

TABLE 1

Analysis results of the final cross-linked structured block copolymer

| pH | Solid content (%) | Viscosity (cP) | $M_W$ | $M_n$ | PD | Charge density at pH 5 (meq/g) |
|---|---|---|---|---|---|---|
| 4 | 17.4 | 7 800 | about 2 000 000 | about 200 000 | 10.4 | 2.9 |

The cross-linked copolymer obtained was suitable for use as a fixative as shown in the following example.

Example 2—Fixative

The structured cross-linked block copolymer that has been prepared according to Example 1 was tested as fixatives on a NSSC pulp (semi-alcaline pulp), which is characterized by high conductivity (10 ms) and high cationic demand (10 000 meq). Turbidity, was used as parameter to estimate the fixative properties of the cross-linked structured block copolymer.

Turbidity was measured using a Turb 555IR WTW. Measurements were expressed in NTU (nephelometric turbidity units, 90° scattered light measurement). The cross-linked structured block copolymer of test 2 significantly decreased the turbidity from 24 000 NTU to 14 000 NTU (dosage 5 000 g/t, as active contents). Decreasing of the turbidity was also noticed at lower dosage (1 000 g/t), include the turbidity number and cationic demand if we have and support experiments. Comparison test were made with corresponding non-cross linked structured block copolymer and a current commercial product, but they did not change the turbidity after chemical addition.

Example 3—Polymerization of Q9 and Acrylamide Based Cross-Linked Structured Block Copolymer A 200 mL multi-necks reactor was equipped with a thermometer, a reflux condenser and a nitrogen inlet. The apparatus was purged constantly with nitrogen. In the reactor, dimethylaminoethylacrylate methyl chloride solution (42 g of 50% water solution) was mixed with deionized water (60 g), Versenex 80 (1.5 g; 80% solution). The solution was mixed very well and pH was adjusted to 4.5 with concentrated sulfuric acid. The bifunctional initiator (0.056 g, dissolved in minimum amount of THF) was added to the previous reaction mixture. After mixing for 10-15 minutes, the reaction mixture was cooled to T=0° C. and $Na_2S_2O_5$ (0.15 g in 15 g of water) was added slowly to the reaction mixture. The temperature was carefully monitored below T=10° C. during addition of $Na_2S_2O_5$. After completion of the addition, the reaction mixture was stirred at T=0° C. overnight (about 16 hours).

In the morning, a small amount of acrylamide (3.75 g in 50% water solution), which was previously acidified to pH=4.5 with concentrated sulfuric acid, was added slowly to the reactor together with the cross-linker (MBA, 1 mL of a solution of 15 mg in 10 mL water). The reaction mixture was then warmed to T=65° C. Then, the rest of acrylamide (26.85 g, 50% water solution) was pumped slowly to the reaction mixture. When the addition was completed, the reaction mixture was stirred at T=65° C. for additional 24 h. The formed cross-linked structured block copolymer was then analyzed by $^1$H and $^{13}$C NMR, GPC, solid content, viscosity (Brookfield), pH and charge density.

TABLE 2

Analysis results of the final cross-linked structured block copolymer

| pH | Solid content (%) | Viscosity (cP) | $M_W$ | $M_n$ | Charge density at pH 5 (meq/g) |
|---|---|---|---|---|---|
| 3.8 | 17.2 | 4 0250 | About 1 500 000 | About 200 000 | 2.9 |

The cross-linked copolymer obtained was suitable for use as a flocculant as shown in the following example.

Example 4—Flocculant

The Q9-acrylamide-based cross-linked structured block copolymers obtained from Example 3 was tested as flocculant with a DIP sludge (dry substance 3.9%). The sludge dewatering tests (Poly Test) have been conducted in order to study the performance of new polymers. Filtrate turbidity has been measured as a response parameter. The tested copolymer shows significant decreasing of the filtrate turbidity. Without treatment, the filtrate turbidity was found to be 9999 NTU. After treatment with a cross-linked Q9-acrylamide-based structured block copolymer (dosage of 2.5 kg/t), the filtrate turbidity decreased to 1315 NTU, which shows that the copolymer obtained was suitable for use as a flocculant.

The invention claimed is:

1. A water soluble cross-linked block copolymer comprising block copolymers cross-linked together using a cross-linking agent, and wherein
   i. each of the block copolymers contain a first block and a second block, and the first and the second block are formed from different monomer compositions,
   ii. the first and second blocks are linked together with a molecular spacer derived from a bifunctional initiator used during the polymerization of said blocks, and
   iii. the monomer compositions used in forming the first and second blocks contain one or more monomers selected from the group consisting of water-soluble non-ionic, cationic or anionic (meth)acrylic monomers, cationic non-acrylic monomers, itaconic acid, and N-vinylformamide, and derivatives thereof.

2. The water soluble cross-linked block copolymer according to claim 1, wherein the one or more monomers are selected from the group consisting of (meth)acrylamide, N-methylolacrylamide, N-methylolmethacrylamide, (meth)acrylic acid, methyl acrylate, ethyl acrylate, butyl acrylate, 2-ethylhexyl acrylate, lauryl acrylate, 2-hydroxyethyl acrylate, 2-hydroxypropyl acrylate, methyl methacrylate, ethyl methacrylate, butyl methacrylate, 2-ethylhexyl methacrylate, lauryl methacrylate, stearyl methacrylate, 2-hydroxyethyl methacrylate, 2-hydroxypropyl methacrylate, glycidyl methacrylate, 2-acrylamide-2-methylpropanesulfonic acid (AMPS), dimethylaminoethylacrylate, diethylaminoethyl acrylate, dimethylaminoethyl methacrylate, diethylaminoethyl methacrylate, N,N-dimethylaminopropylacrylamide, N,N-dimethylaminopropylmethacrylamide, 2-N-morpholinoethyl methacrylate, 2-diisopropylaminoethyl methacrylate, 1-(2-methacryloyloxyethyl) imidazole, 2-(tert-butylamino)ethyl methacrylate, N,N-dimethylaminoethyl acrylamide, N-[2-(dimethylamino)-1,1-dimethylethyl] acrylamide, N-vinylformamide, and their methyl chloride or methyl sulfate quaternaries or mixtures thereof; or methacrylamidopropyltrimethylammonium chloride (MAPTAC), dimethylaminoethylacrylate methyl chloride (Q9), itaconic acid and diallyldimethylammonium chloride (DADMAC).

3. The water soluble cross-linked block copolymer according to claim 1, wherein both the first and the second block are formed of homopolymers.

4. The water soluble cross-linked block copolymer according to claim 1, wherein the first block is a random copolymer and the second block is homopolymer or random copolymer.

5. The water soluble cross-linked block copolymer according to claim 1, wherein the first or second block is an NVF-based block comprising a homopolymer, which is formed from N-vinylformamide (NVF) monomer.

6. The water soluble cross-linked block copolymer according to claim 1, wherein the first or second block is an NVF-based block, which is formed from N-vinylformamide (NVF) monomer, and wherein the formamide groups of the NVF-based block are at least partially hydrolyzed to amino groups.

7. The water soluble cross-linked block copolymer according to claim 1, wherein said block copolymer is polymerized by using a bifunctional initiator having the formula (I)

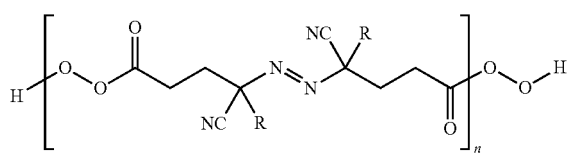

wherein R is H, or $C_{1-5}$-alkyl, and n is from 1 to 10.

8. The water soluble cross-linked block copolymer according to claim 1, wherein the cross-linking agent is a radical polymerizable cross-linking agent.

9. The water soluble cross-linked block copolymer according to claim 1, wherein the cross-linking agent is selected from the group consisting of N,N'-methylenebisacrylamide (MBA), 1,4-bis(acryloyl)piperazine, N,N'-(1-methyl-1,2-ethanediyl)bis(2-propenamide), N,N'-propylidenebis(2-propenamide), N,N'-butylidenebis(2-propenamide), N,N'-1,12-dodecanediylbis(2-propenamide), N,N'-1,9-nonanediylbis(2-propenamide), N,N'-1,5-pentanediylbis(2-propenamide), N,N'-1,4-butanediylbis(2-propenamide), N,N'-1,6-hexanediylbis(2-propenamide), N,N'-ethylidenebis(2-propenamide), N,N'-1,3-propanediylbis(2-propenamide), N,N'-1,2-ethanediylbis(2-propenamide), N,N'-1,4-cyclohexanediylbis(2-propenamide), N,N'-1,8-octanediylbis(2-propenamide), N,N'-bisacryloylyimidazoline, ethyleneglycoldimethacrylate, 1,4-diacroyl piperazine, pentaerythritoltriacrylate, trimethylpropanetrimethylacrylate, and pentaerythritoltetraacrylate.

10. A method for preparing a water soluble cross-linked block copolymer, wherein at least two different monomers are polymerized via a two-step copolymerization the method comprising the following steps:
    i. the first block of the block copolymer is polymerized using a bifunctional initiator,
    ii. the second block of the block copolymer is then polymerized using the same initiator,
    iii. the first or second blocks are cross-linked using a crosslinking agent either during the polymerization of said blocks, or as a separate crosslinking step after the steps i) and ii) are performed,
    wherein the monomers used in polymerizing the first and second blocks are different with each other and they are selected from the group consisting of water-soluble non-ionic, cationic or anionic (meth)acrylic monomers, cationic non-acrylic monomers, itaconic acid, and N-vinylformamide, and derivatives thereof.

11. The method according to claim 10, wherein the monomers are selected from the group consisting of (meth)acrylamide, N-methylolacrylamide, N-methylolmethacrylamide, (meth)acrylic acid, methyl acrylate, ethyl acrylate, butyl acrylate, 2-ethylhexyl acrylate, lauryl acrylate, 2-hydroxyethyl acrylate, 2-hydroxypropyl acrylate, methyl methacrylate, ethyl methacrylate, butyl methacrylate, 2-ethylhexyl methacrylate, lauryl methacrylate, stearyl methacrylate, 2-hydroxyethyl methacrylate, 2-hydroxypropyl methacrylate, glycidyl methacrylate, 2-acrylamide-2-methylpropanesulfonic acid (AMPS), dimethylaminoethyl acrylate, diethylaminoethyl acrylate, dimethylaminoethyl methacrylate, diethylaminoethyl methacrylate, N,N-dimethylaminopropylacrylamide, N,N-dimethylaminopropylmethacrylamide, 2-N-morpholinoethyl methacrylate, 2-diisopropylaminoethyl methacrylate, 1-(2-methacryloyloxyethyl)imidazole, 2-(tert-butylamino)ethyl methacrylate, N,N-dimethylaminoethyl acrylamide, N-[2-(dimethylamino)-1,1-dimethylethyl] acrylamide, N-vinylformamide, and their methyl chloride or methyl sulfate quaternaries or mixtures thereof; or methacrylamidopropyltrimethylammonium chloride (MAPTAC), dimethylaminoethylacrylate methyl chloride (Q9), itaconic acid and diallyldimethylammonium chloride (DADMAC).

12. The method according to claim 10, wherein the polymerization of the first block two different monomers are used and thus a random copolymer is formed.

13. The method according to claim 10, wherein the polymerization of the second block two different monomers are used and thus a random copolymer is formed.

14. The method according to claim 10, wherein the cross-linking agent is N,N'-methylenebisacrylamide (MBA).

15. A paper making process or a sludge dewatering or water purification process, comprising adding the water soluble cross-linked block copolymer according to claim 1 to pulp or water, respectively.

16. The process according to claim 15, wherein the cross-linked block copolymer is used in paper making process as a fixative, a drainage agent, a retention agent, a dry strength agent, a coating agent, a surface sizing agent, or as an emulsifier for sizing.

17. The method according to claim 16, wherein the dosing amounts of cross-linked block copolymer/pulp are between 50 g/1000 kg to 2000 g/1000 kg.

18. The method according to claim 16, wherein the dosing amounts of cross-linked block copolymer/pulp are between 100 g/1000 kg to 1000 g/1000 kg.

19. The method according to claim 16, wherein the dosing amounts of cross-linked block copolymer/pulp are between 100 g/1000 kg to 500 g/1000 kg.

20. The method according to claim 15, wherein the cross-linked block copolymer is used in sludge dewatering or in water purification process as a flocculant added to water.

* * * * *